United States Patent
Lynch

(10) Patent No.: US 9,117,574 B2
(45) Date of Patent: Aug. 25, 2015

(54) ADJUSTABLE DOUBLE INSULATOR COVER FOR ELECTRICAL DISTRIBUTION SYSTEMS

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 115 days.

(21) Appl. No.: 14/056,469

(22) Filed: Oct. 17, 2013

(65) Prior Publication Data

US 2015/0107892 A1   Apr. 23, 2015

(51) Int. Cl.
*H01B 17/56* (2006.01)
*H01B 17/00* (2006.01)
*H02G 7/00* (2006.01)

(52) U.S. Cl.
CPC ............... *H01B 17/56* (2013.01); *H01B 17/00* (2013.01); *H02G 7/00* (2013.01)

(58) Field of Classification Search
CPC .......... H01B 17/56; H01B 9/008; H01B 9/00; H01B 17/00; H02G 7/00
USPC .......................................... 174/137 R, 138 F
See application file for complete search history.

(56) References Cited

U.S. PATENT DOCUMENTS

| 3,555,625 | A | * | 1/1971 | Hoban | ......................... | 24/131 C |
| 8,907,222 | B2 | * | 12/2014 | Stransky et al. | ............ | 174/138 F |
| 2015/0114678 | A1 | * | 4/2015 | Lynch | .............................. | 174/66 |

* cited by examiner

*Primary Examiner* — Dhirubhai R Patel
(74) *Attorney, Agent, or Firm* — Patent Law Group LLP; Brian D. Ogonowsky

(57) ABSTRACT

An expandable dielectric cover system for a pair of insulators supporting a conductor includes a first insulator cover and a separate insulator cover. A sleeve covers portions of the first insulator cover and second insulator cover and covers the conductor between the two covers. The sleeve covers a variable length of the first insulator cover and second insulator cover to accommodate a wide range of separations between the two covers while still covering the conductor. Pivotable arms are connectable to the other sides of the covers for covering a length of the conductor extending away from the sleeve.

18 Claims, 4 Drawing Sheets

ADJUSTABLE DOUBLE INSULATOR COVER FOR ELECTRICAL DISTRIBUTION SYSTEMS

FIELD OF THE INVENTION

This invention relates to an insulating cover system for high voltage power line insulators and conductors (wires) and, in particular, to a cover system that is adapted to cover two insulators mounted a variable distance apart while still covering the conductor between the two insulators.

BACKGROUND

A wood utility pole, formed from the trunk of a tree, is typically used for supporting high voltage (HV) conductors (e.g., twisted wire strands) in a power distribution system. Since the poles are formed from trees, the pole diameters vary from pole to pole. For example, the pole may have a diameter at the top of the pole of five inches, and four feet down from the top of the pole it may be ten inches. Another pole may have a diameter at the top of ten inches, and four feet down from the top it may have a diameter of fourteen inches.

Each pole has secured to it one or more horizontal crossarms that support ceramic insulators which, in turn, support the HV conductors. Two crossarms are popular for their added strength and reliability. The crossarms are affixed to the pole using either bolts, a brace, a bracket, or other means. A conductor is typically affixed over the top of each insulator via a metal tie wire, a bracket, or other means.

FIG. 1 is a side view of a top portion of a wooden pole 10, looking into the ends of two horizontal crossarms 12 and 14. FIG. 2 is a top down view of the pole 10 of FIG. 1 showing four sets of insulators supporting four conductors. The crossarms 12 and 14 are typically wood, such as 6 feet×3.5 inches×4.5 inches, depending on the support strength needed for the conductors. Material other than wood is also used for crossarms.

Ceramic insulators 16 and 18 are affixed to the crossarms 12 and 14 by bolts 20. A conductor 22 (typically twisted wire strands) seats in a groove in the insulators 16/18 or in some other securing feature, as previously described.

The crossarms 12/14 in FIG. 2 are shown supporting additional sets of insulators supporting additional conductors for 3-phase voltages. Alternatively, additional crossarms attached at different heights on the pole 10 may support the additional sets of insulators and the conductors for 3-phase voltages. The invention is applicable to all of the sets of insulators.

Since the diameter of the pole 10 is variable, the separation of the insulators 16/18 is unknown prior to the pole 10 being assembled. Typical separations are 5-16 inches.

Insulator covers, which are used in conjunction with extension arms that cover a length of the conductors, are frequently used for the protection of wildlife and preventing outages, permanent or momentary, due to shorts by trees, wildlife, debris, etc. The insulator/conductor covers are typically required to be 72 inches in length according to the Suggested Practices Guide developed by the Avian Power Line Interaction Committee (APLIC). Insulator/conductor covers measure 36 inches in one direction from the center of the insulator and 36 inches in the other direction. To obtain this 72 inch coverage, manufacturers have been designing these covers in three separate parts: the insulator cover, one extension arm connectable to one side of the insulator cover, and a second extension arm connectable to the other side of the insulator cover.

For covering the insulators 16 and 18 in FIG. 1 along with the conductor 22 between the insulators, such conventional covers would not work. This is because the distance between the insulators 16/18 varies from pole to pole, and an extension arm would be too long to fit between the insulators 16/18 and/or the extension arm would not precisely fit between the insulator covers. Additionally, the conductor 22 sags on one side of each insulator 16/18 due to the weight of the conductor 22 between poles, but the conductor 22 between the insulators 16/18 does not sag. The conventional extension arms could not accommodate the asymmetrical and variable conductor sag.

A one piece double insulator cover, with a fixed conductor cover between them, will not work or fit correctly around the two insulators 16/18 since their separation is unknown until the pole is assembled. A wide variety of double insulator covers would have to be available to the lineman, while in the field, in different sizes or lengths to accommodate all the possible separations of the insulators.

What is needed is a practical cover system for use with a pair of insulators supporting a conductor, where the separation between the insulators is variable.

SUMMARY

The invention utilizes two insulator covers that are independent of each other and a separate sleeve that covers the conductor between the insulators. A single sleeve can accommodate a wide range of separations between the insulator covers. The insulator covers are asymmetrical and have one side that connects to an arm for covering the conductor and another side that faces the other insulator cover. The arm has a degree of movement that accommodates vertical and lateral angles of the conductor, while the sleeve is generally straight to accommodate the straight conductor between the insulators.

The end portions of the sleeve overlap the tops of the insulator covers along a variable length of the insulator covers to enable the insulator covers to have variable separations while the end portions of the sleeve still overlap the insulator covers. For example, a single sleeve may accommodate a range of separations of the insulators of 5-14 inches. If the separation is greater than 14 inches, another sleeve may be selected in the field that can accommodate separations between 14-22 inches. In the embodiments described, each sleeve accommodates at least an 8 inch variation in insulator separation while still completely covering the conductor between the insulator covers.

The cover arms are independent of each insulator cover and are attachable to the insulator covers without tools.

Accordingly, the same multi-piece double insulator cover provides an adjustable fit for a range of pole diameters while accommodating a range of conductor angles.

Other features of the cover system are also described.

BRIEF DESCRIPTION OF THE DRAWINGS

Elements labeled with the same numerals may be identical or similar.

DETAILED DESCRIPTION

Figure 2:
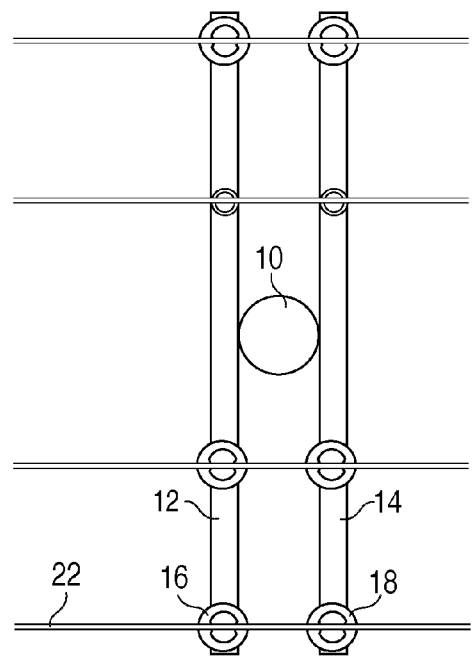
FIG. 2 is a top down view of the pole of FIG. 1.
Figure 3:
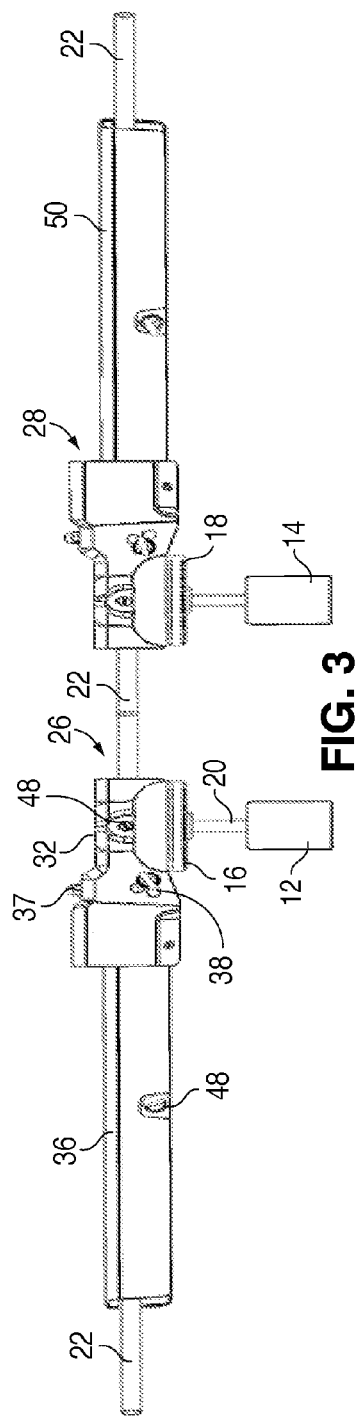
FIG. 3 is a side view of two insulator covers covering the insulators of FIG. 2, with extension arms attached to one side of each insulator cover for covering the conductor. The separation between the centers of the insulators is 14 inches.
Figure 4:
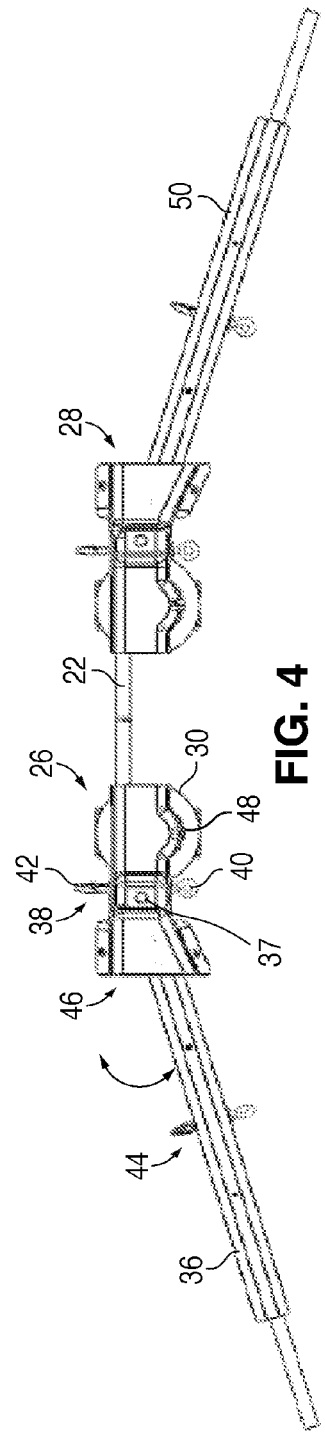
FIG. 4 is a top down view of the structure of FIG. 3.

FIG. 3 is a side view of a left insulator cover 26 and a right insulator cover 28, each covering an associated insulator 16 and 18 from FIG. 2. FIG. 4 is a top down view of the structure of FIG. 3. All materials may be polymers, such as PVC, or other type of moldable durable dielectric material.

Each insulator cover 26/28 includes a bottom bell-shaped portion 30, for covering the standard ceramic insulator, and a top portion 32 for covering the top of the insulator and the conductor 22. The expanded bottom portion of the ceramic insulator is generally known as a skirt. In the example of FIG. 3, the separation between the centers of the insulators 16/18 is 14 inches, but a separation up to 22 inches can be accommodated by the same cover system. The conductor 22 is shown discontinuous between the insulators 16/18 to indicate that it is much longer than shown.

The insulator covers 26/28 are positioned over the insulators 16/18, and a pin 38 is inserted with a hot-stick or by hand through two holes in the cover 26. An identical pin is used for the cover 28. The pin 38 has a ring 40 at one end for the hot-stick and a resilient, expandable tip 42 at the other end. When the pin 38 is pushed through the holes, the tip 42, being narrow at its end and tapered, compresses to easily pass through the holes. The tip 42 has a greater than 60 degree angle rim portion that makes it more difficult to remove. Therefore, the pin 38 remains held in place. The pin 38 is under the conductor 22. Since the pin 38 is under the conductor 22, the insulator cover 26 is blocked from being lifted off the insulator 16 and conductor 22 by wind.

A left extension arm 36 attaches to the left insulator cover 26 with a vertically extending bolt 37, or any other suitable vertical shaft. The arm 36 has a flange with a hole through which the bolt 37 passes. The flange pivots with respect to the bolt 37 to allow the arm 36 to accommodate bending of the conductor 22. As seen in FIG. 4, the insulator cover 26 has a flared opening 46 for accommodating the bending of the conductor 22 without any stress. The arm 36 also has a degree of vertical movement with respect to the bolt 37, which allows the arm 36 to accommodate sagging of the conductor 22.

The arm 36 is typically secured to the cover 26 by the manufacturer or otherwise secured before the cover system is taken into the field, so that tools are not required by the lineman for installing the cover system.

The arm 36 has a set of holes through which is inserted a pin 44 under the conductor 22 for additionally loosely securing the arm 36 over the conductor 22. The pin 44 has features similar to that of the pin 38 but may be shorter.

Figure 1:
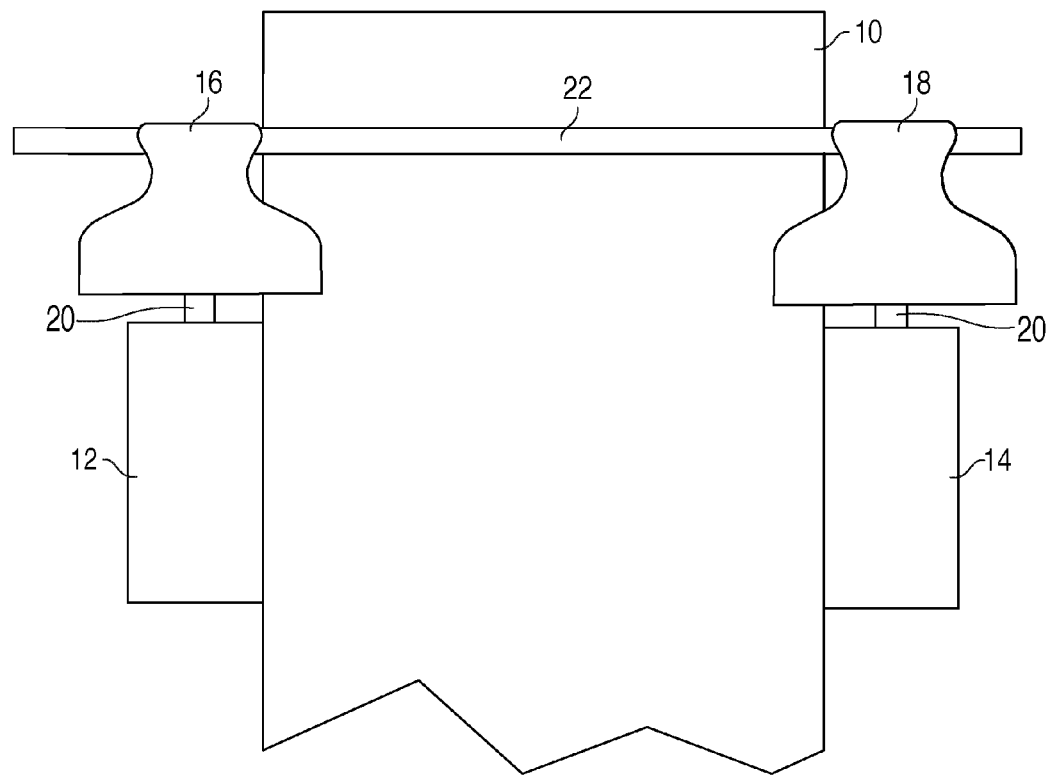
FIG. 1 is a side view of the top section of a wooden utility pole having crossarms, where ceramic insulators are supported on the crossarms for supporting a conductor.

Optionally, a retaining device, such as a plastic bolt 48, is located on the side of the insulator cover 26, below the ear of the insulator 16, to prevent the cover 26 from lifting and potentially rotating about the insulator 16. The bolt 48 is screwed in sufficiently to contact the narrow neck of the insulator 16 (shown in FIG. 1) so as to block the cover 26 from rotating about the insulator 16. The cover 26 is already blocked from coming off the conductor 22 by the pin 38.

The right insulator cover 28 and right extension arm 50 are a mirror image of the left insulator cover 26 and left cover arm 36 and have the same securing features.

Figure 5:
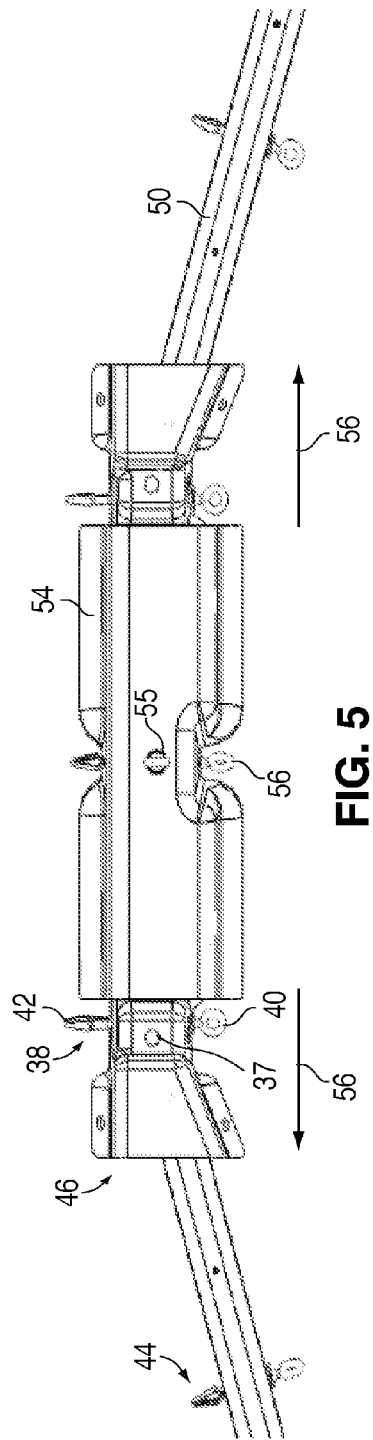
FIG. 5 is a top down view of the structure of FIG. 4 after a sleeve has been placed over the insulation covers, where the sleeve covers the conductor between the insulator covers, and where the sleeve can accommodate separations between the insulators of 14-22 inches.
Figure 6:
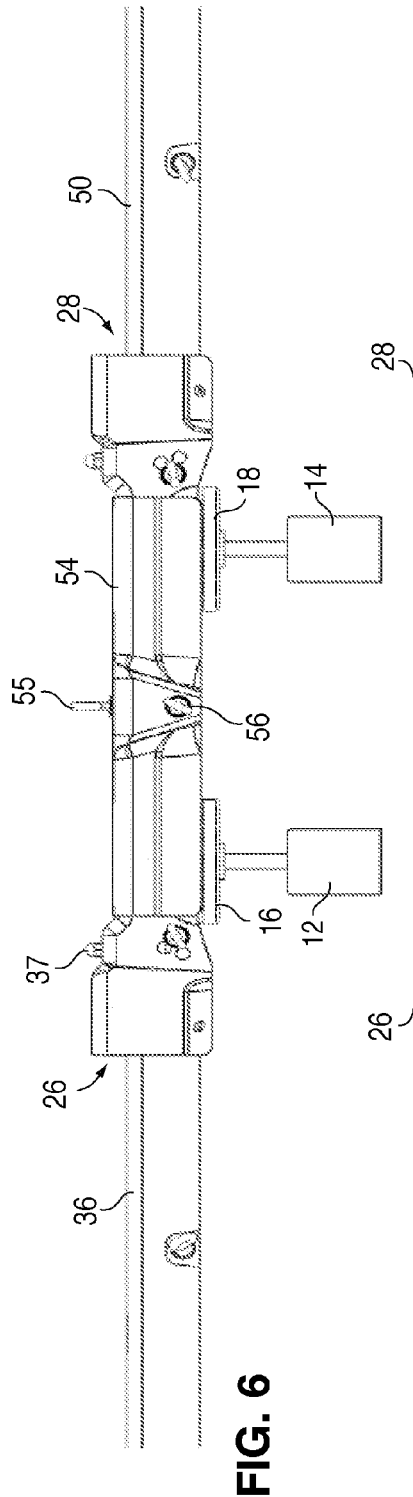
FIG. 6 is a side view of the structure of FIG. 5.
Figure 7:
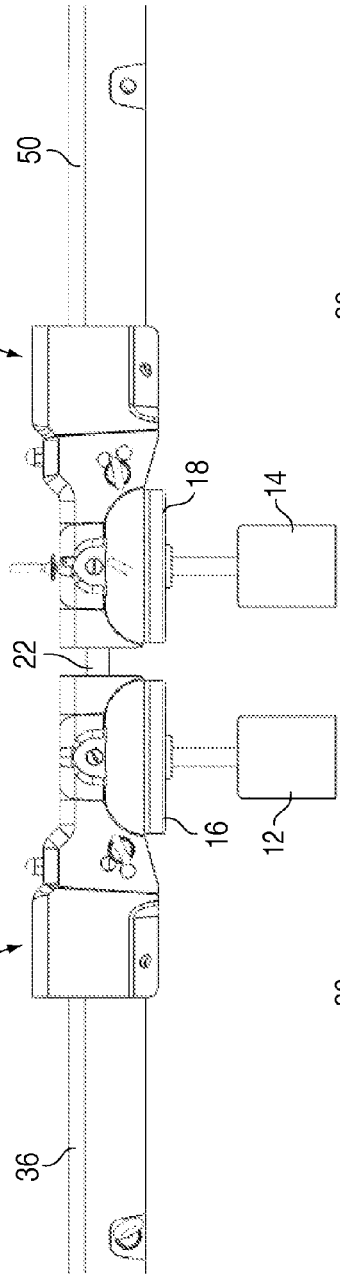
FIGS. 7-10 are identical to FIGS. 3-6, respectively, except that the insulators are 5 inches apart, and a sleeve is used that can accommodate separations between the insulators of 5-14 inches.
Figure 8:
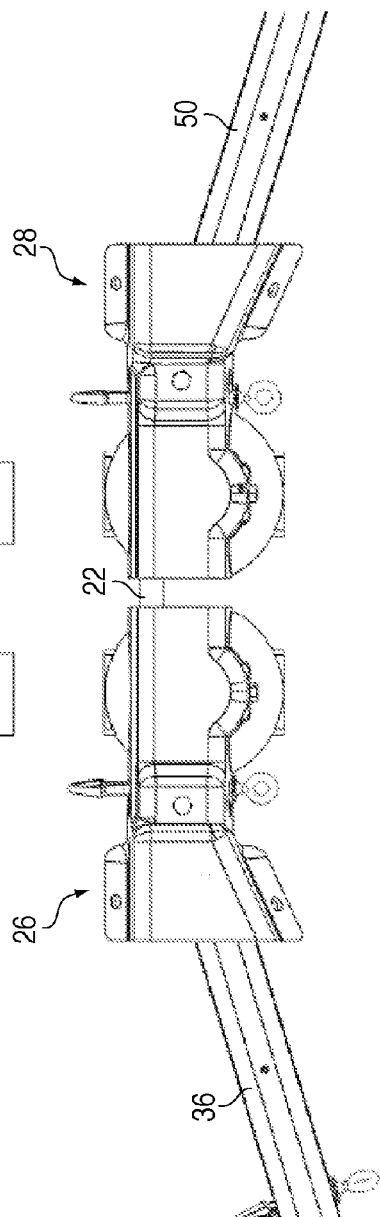
Figure 9:
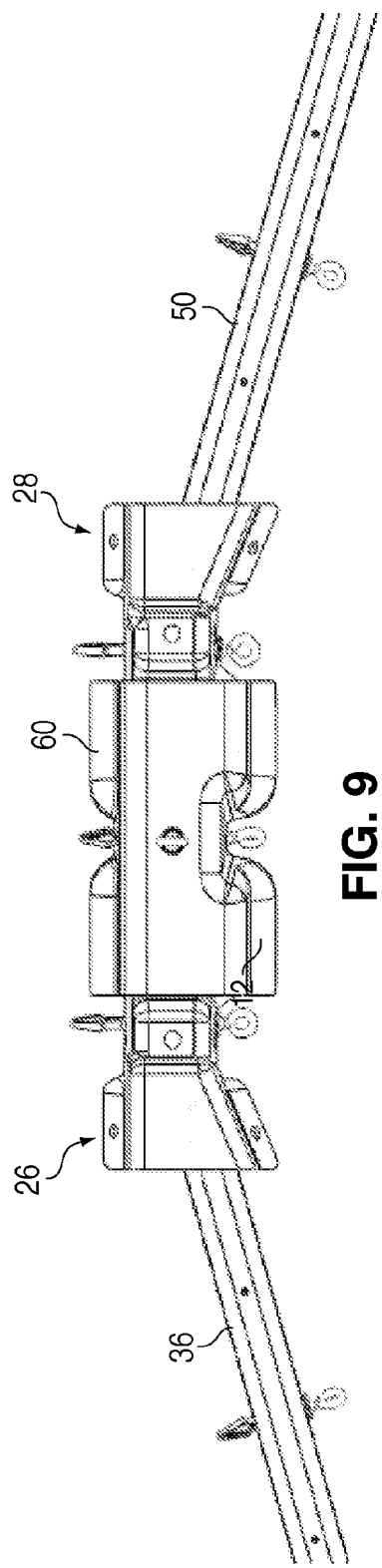
Figure 10:
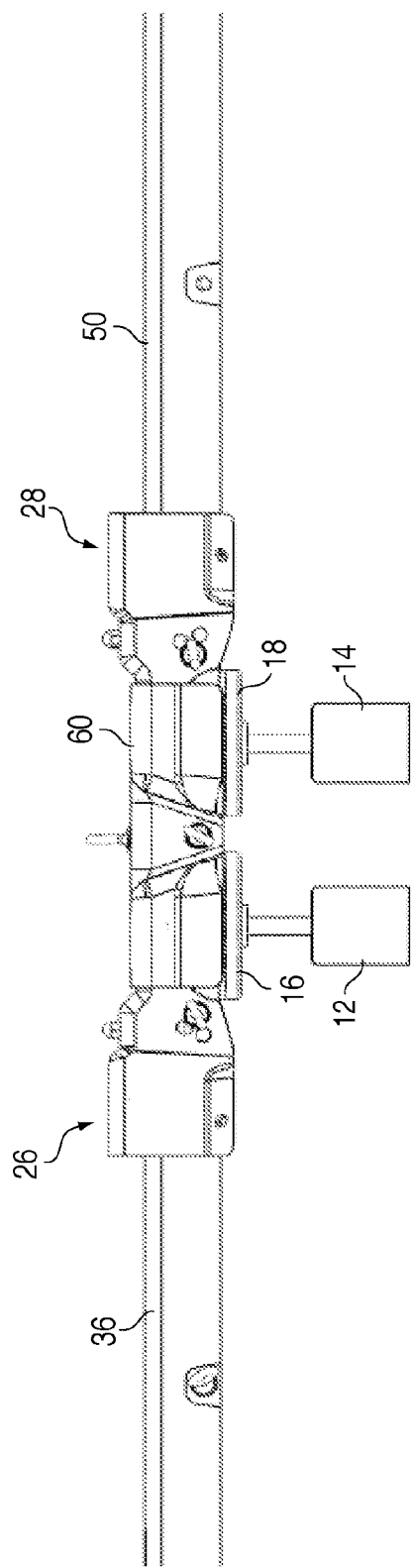

Since the separation between the insulators 16/18 is variable and the conductor 22 between the insulators 16/18 must be completely covered, a sleeve 54, shown in FIGS. 5 and 6, is provided that fits over the tops of the insulator covers 26/28 to varying lengths, depending on the separation. The sleeve 54 has a bottom opening generally corresponding to a bisected cross-section of the insulator covers 26/28, so any portion of the end sections of the sleeve 54 can fit directly over the insulator covers 26/28 and form a friction fit, which prevents the sleeve 54 from sliding after being positioned over the insulator covers 26/28. Once the insulator covers 26/28 are installed, the sleeve 54 is simply centered with respect to the insulators 16/18 and pushed down over the covers 26/28 and center conductor 22 portion. A ring 55 attached to the sleeve 54 allows the sleeve 54 to be placed using a hot-stick. Holes are provided in the insulator covers 26/28 and arms 36/50 to allow them to be installed and removed with the same hot-stick.

In the example, the sleeve 54 is about 18 inches long, and the exposed conductor 22 between the insulator covers 26/28 is about 10 inches long. The length of each insulator cover 26/28 that the sleeve 54 can fit over is about 4 inches, providing about 8 inches of acceptable variation between the insulators 16/18 (i.e., up to 22 inches) for the same sleeve 54. FIGS. 5 and 6 show the minimum separation between the centers of the insulators 16/18 (14 inches) for use with that particular sleeve 54. FIGS. 5 and 6 illustrate arrows 56 showing how the separation of the insulator covers 26/28 may be increased (up to 8 inches) while the sleeve 54 still rests on a portion of each insulator cover 26/28 for covering the center conductor 22 portion.

Once the sleeve 54 is in place, a pin 56 is pushed through two holes near the bottom-center of the sleeve 54, and under the conductor 22, to secure the sleeve 54 in place. The pin 54 may be identical to the pin 38.

In another embodiment, a plastic bolt is inserted through the bottom hole of the sleeve 54, instead of the pin 54, and tightened to compress the sleeve 54 against the insulator covers 26/28 to more firmly secure the sleeve 54 to the covers 26/28.

Accordingly, since the lineman generally knows the range of separations of the insulators 16/18 for a particular type of pole 10 (FIG. 2) but those separations may typically have an 8 inch range, the cover system of FIGS. 3-6 can be used for the entire range of separations.

In the example, the minimum separation between the insulators 16/18 for use with the sleeve 54 is 14 inches. If the separation were anywhere between 5 inches and 14 inches, a smaller sleeve would be used, as shown in FIGS. 7-10. In FIGS. 7-10, the same insulator covers 26/28 and arms 36/50 are used, but a shorter sleeve 60 (FIGS. 9 and 10) is used since the separation between the insulators 16/18 is only 5 inches, and there is only 1 inch of the center portion of the conductor 22 exposed. In the example of FIGS. 7-10, the sleeve 60 is about 9 inches long, where the sleeve 60 overlaps each insulator cover 26/28 by 4 inches, and overlaps the 1 inch gap between the insulator covers 26/28. The insulators 16/18 can be separated up to about 14 inches while the same sleeve 60 can be used to cover the conductor 22.

Accordingly, the same insulator covers 26/28 and arms 36/50 can be used for any practical range of separations between the insulators 16/18, while only one or two sleeves 54/60 need be available to the lineman to accommodate a very wide range of separations. Typically, only one sleeve 54 or 60 will suffice for a particular distribution system.

The sleeve 54/60, insulator covers 26/28, and arms 36/50 also prevent the covered structures getting wet so there can be no electrical short due to water.

There are a variety of insulator shapes, and the insulators 16/18 are just examples. Other insulators are longer with sides having multiple ridges for higher voltages, and other insulators are simpler such as hemispherical with a connector, such as a vice, on top. The insulator covers 26/28 and sleeve 54/60 may be molded to accommodate any standard insulator shape while still retaining all aspects of the invention.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A dielectric cover system for a first insulator, a second insulator, and a conductor supported by the first insulator and the second insulator, the conductor being for carrying a voltage, the first insulator and second insulator being supported by a support structure, the cover comprising:
    a first insulator cover configured to cover the first insulator, the first insulator cover having a first length parallel to the conductor;
    a separate second insulator cover configured to cover the second insulator, the second insulator cover having a second length parallel to the conductor; and
    a separate sleeve configured to extend between the first insulator cover and the second insulator cover and also cover the portion of the conductor extending between the first insulator cover and the second insulator cover,
    wherein the sleeve has a third length that enables the sleeve to overlap a variable part of the first length of the first insulator cover and a variable part of the second length of the second insulator cover so that a range of separations between the first insulator and the second insulator can be accommodated with the first insulator cover, the second insulator cover, and the sleeve while the sleeve covers the portion of the conductor extending between the first insulator cover and the second insulator cover.

2. The system of claim 1 further comprising a first arm attachable to a first side of the first insulator cover, and a second arm attachable to a second side of the second insulator cover, the first side facing away from the second insulator cover, and the second side facing away from the first insulator cover.

3. The system of claim 2 wherein the first arm is pivotable around a first vertical shaft within the first insulator cover in at least a lateral direction with respect to the first insulator cover, wherein the second arm is pivotable around a second vertical shaft within the second insulator cover in at least a lateral direction with respect to the second insulator cover.

4. The system of claim 2 wherein the first arm is attached to the first insulator cover by a first vertical shaft, and wherein the second arm is attached to the second insulator cover by a second vertical shaft.

5. The system of claim 4 wherein the first arm is secured over the conductor by a first pin extending under the conductor, and wherein the second arm is secured over the conductor by a second pin extending under the conductor.

6. The system of claim 1 wherein the sleeve is positioned over the first insulator cover and the second insulator cover and secured in place over the conductor by a blocking device extending through the sleeve and under the conductor.

7. The system of claim 1 wherein the sleeve has a cross-section at its ends generally corresponding to a bisected cross-section of the first insulator cover and second insulator cover to allow the sleeve to fit over various lengths of the first insulator cover and the second insulator cover.

8. The system of claim 1 wherein the first insulator and the second insulator have an expanded skirt portion near their bottoms, and the first insulator cover and the second insulator cover are shaped to accommodate the skirt portion.

9. The system of claim 1 wherein the third length of the sleeve, and lengths of the first insulator cover and second insulator cover, allow the sleeve to accommodate a range of separations between the first insulator and the second insulator of at least 4 inches.

10. The system of claim 1 further comprising the first insulator cover affixed over the first insulator, the second insulator cover affixed over the second insulator, and the sleeve affixed over the portion of the conductor extending between the first insulator cover and the second insulator cover.

11. The system of claim 1 wherein the support structure comprises two crossarms affixed to a utility pole.

12. A method of covering a first insulator, a second insulator, and a conductor supported by the first insulator and the second insulator, the conductor being for carrying a voltage, the first insulator and second insulator being supported by a support structure, the method comprising:
    placing a first insulator cover over the first insulator, the first insulator cover having a first length parallel to the conductor;
    placing a separate second insulator cover over the second insulator, the second insulator cover having a second length parallel to the conductor, such that there is a portion of the conductor extending between the first insulator cover and the second insulator cover; and
    placing a sleeve over portions of the first insulator cover and second insulator cover and over the portion of the conductor extending between the first insulator cover and the second insulator cover,
    wherein the sleeve has a third length that enables the sleeve to overlap a variable part of the first length of the first insulator cover and a variable part of the second length of the second insulator cover so that a range of separations between the first insulator and the second insulator can be accommodated with the first insulator cover, the second insulator cover, and the sleeve while the sleeve covers the portion of the conductor extending between the first insulator cover and the second insulator cover.

13. The method of claim 12 further comprising:
    attaching a first arm to a first side of the first insulator cover for covering the conductor; and
    attaching a second arm to a second side of the second insulator cover for covering the conductor, the first side facing away from the second insulator cover, and the second side facing away from the first insulator cover.

14. The method of claim 12 wherein the step of placing the sleeve comprises positioning the sleeve over the first insulator cover and the second insulator cover and securing the sleeve in place over the conductor by a blocking device extending through the sleeve and under the conductor.

15. The method of claim 12 wherein the sleeve has a cross-section at its ends generally corresponding to a bisected cross-section of the first insulator cover and second insulator cover to allow the sleeve to fit over various lengths of the first insulator cover and the second insulator cover.

16. The method of claim 12 wherein the first insulator and the second insulator have an expanded skirt portion near their bottoms, and the first insulator cover and the second insulator cover are shaped to accommodate the skirt portion.

17. The method of claim 12 wherein the first third length of the sleeve, and lengths of the first insulator cover and second insulator cover, allow the sleeve to accommodate a range of separations between the first insulator and the second insulator of at least 4 inches.

18. The method of claim 12 wherein the support structure comprises two crossarms affixed to a utility pole.

\* \* \* \* \*